United States Patent
Butler (10) Patent No.: US 12,546,097 B1
(45) Date of Patent: Feb. 10, 2026

(54) SYSTEMS AND DEVICES FOR MOUNTING A THERMOSTATIC MIXING VALVE AND METHODS THEREOF

(71) Applicant: Double LEB LLC, Azle, TX (US)

(72) Inventor: Philip Butler, Azle, TX (US)

(73) Assignee: Double Leb, LLC, Azle, TX (US)

(*) Notice: Subject to any disclaimer, the term of this patent is extended or adjusted under 35 U.S.C. 154(b) by 0 days.

(21) Appl. No.: 19/212,262

(22) Filed: May 19, 2025

Related U.S. Application Data (60) Provisional application No. 63/680,363, filed on Aug. 7, 2024.

(51) Int. Cl.
 *E03C 1/02* (2006.01)
(52) U.S. Cl.
 CPC .................................. *E03C 1/021* (2013.01)
(58) Field of Classification Search
 CPC ...................................... E03C 1/021
 USPC .............. 4/676, 695; 248/65, 67.7, 68.1, 69, 248/74.1–74.5
 See application file for complete search history.

(56) References Cited

U.S. PATENT DOCUMENTS

| | | | |
|---|---|---|---|
| 4,957,251 A * | 9/1990 | Hubbard | F16L 3/22 248/68.1 |
| 8,522,814 B2 | 9/2013 | Kempf et al. | |
| 2008/0164381 A1* | 7/2008 | Fleischman | A47C 31/11 248/74.2 |
| 2014/0117171 A1* | 5/2014 | Mori | G10H 3/146 248/69 |
| 2018/0274699 A1 | 9/2018 | Ratzlaff et al. | |
| 2022/0166202 A1 | 5/2022 | Steeger et al. | |

FOREIGN PATENT DOCUMENTS

| | | |
|---|---|---|
| CA | 2945697 A1 | 8/2015 |
| CN | 110966461 A | 4/2020 |
| CN | 114719109 A | 7/2022 |
| CN | 220037595 U | 11/2023 |
| DE | 29805302 U1 | 7/1998 |
| JP | 2001182110 A | 7/2001 |

(Continued)

OTHER PUBLICATIONS

Bikepacing: King Cage Manything Cage & Universal Support Bold (USB), Bikepacking. com, Apr. 4, 2016, 27 pages.

(Continued)

*Primary Examiner* — Tuan N Nguyen
(74) *Attorney, Agent, or Firm* — Whitaker Chalk Swindle & Schwartz PLLC; Juan Vasquez (57) ABSTRACT

A mounting system and device for securing a thermostatic mixing valve (TMV) under a sink. The device includes a pipe-mounting section configured to engage an outer surface of a pipe, such as a pipe, and cooperate with an attachment mechanism for non-destructive securement to the pipe. A securing section, connected to the pipe-mounting section directly or via an optional support section, includes a holder configured to releasably secure at least a portion of the TMV. The mounting system prevents damaging wall attachments by utilizing the existing pipe structure for support, providing a stable and secure mounting for the TMV, and preventing potential damage and improving safety by securing the valve away from accidental contact. Embodiments may include a U-shaped configuration.

20 Claims, 7 Drawing Sheets

(56) References Cited

FOREIGN PATENT DOCUMENTS

| KR | 200400663 | 11/2005 |
|----|-----------|---------|
| KR | 101161713 | 7/2012 |
| KR | 20190017196 | 2/2019 |
| WO | 2024094984 A1 | 5/2024 |

OTHER PUBLICATIONS

Amazon: Fireworks Map/Pro Gas Bottle Holder, https://www.amazon.in/Fireworks-Map-Pro-Bottle-Holder/dp/B0052MK2UO.
Hardcastle, Charlie: "Best Mixing Valve: Important Piece of Plumbing", https://www.waterheaterhub.com/best-mixing-valve, 36 pages.
Caleffi Hydronic Solutions: "Sinkmixer Scald Protection Thermostatic Mixing Valve", https://www.youtube.com/watch?v=qq_rBnUW4Qc.
sloanrepair.com: "Thermostatic Mixing Valve Bracket", Sep. 24, 2020, https://sloanrepair.com/products/thermostatic-mixing-valve-bracket, 4 pages.
Watts: "Thermostatic Mixing Valves", Apr. 7, 2017, 3 pages.
Fritz Gyger AG: "Micro Valve Mounting Type Thread or Cylinder", https://www.fgyger.ch/micro-valves/valve-holder-2/?lang=en, Sep. 24, 2021, 6 pages.

\* cited by examiner

SYSTEMS AND DEVICES FOR MOUNTING A THERMOSTATIC MIXING VALVE AND METHODS THEREOF

CROSS-REFERENCE TO RELATED APPLICATIONS

The present application claims priority to U.S. Prov. App. Ser. No. 63/680,363, filed on Aug. 7, 2024, titled "MOUNTING SYSTEM FOR A THERMOSTATIC MIXING VALVE," the entirety of which is incorporated herein by reference for all purposes.

TECHNICAL FIELD

The present disclosure relates generally to thermostatic mixing valves, and more particularly to a devices, systems, and methods for mounting a thermostatic mixing valve.

BACKGROUND

A thermostatic mixing valve (TMV) serves the important function of mixing hot and cold water to ensure a consistent and safe water temperature output. This is crucial for preventing scalding, especially for vulnerable individuals like children and the elderly. Typically, these TMVs are installed under sinks and connected directly to the water supply hoses.

In a typical installation, TMVs are not mounted to any surface and are often left hanging, supported only by the tension of the connected water lines. This lack of secure mounting can lead to several problems. For example, the TMV itself can be damaged. But even more, since TMVs can become hot during operation, an unsecured, dangling valve has the potential to cause burns if accidentally touched. This risk is heightened for children and persons with disabilities because the low-hanging position of the valve under the sink often aligns with their height, increasing the likelihood of inadvertent contact.

Figure 1:
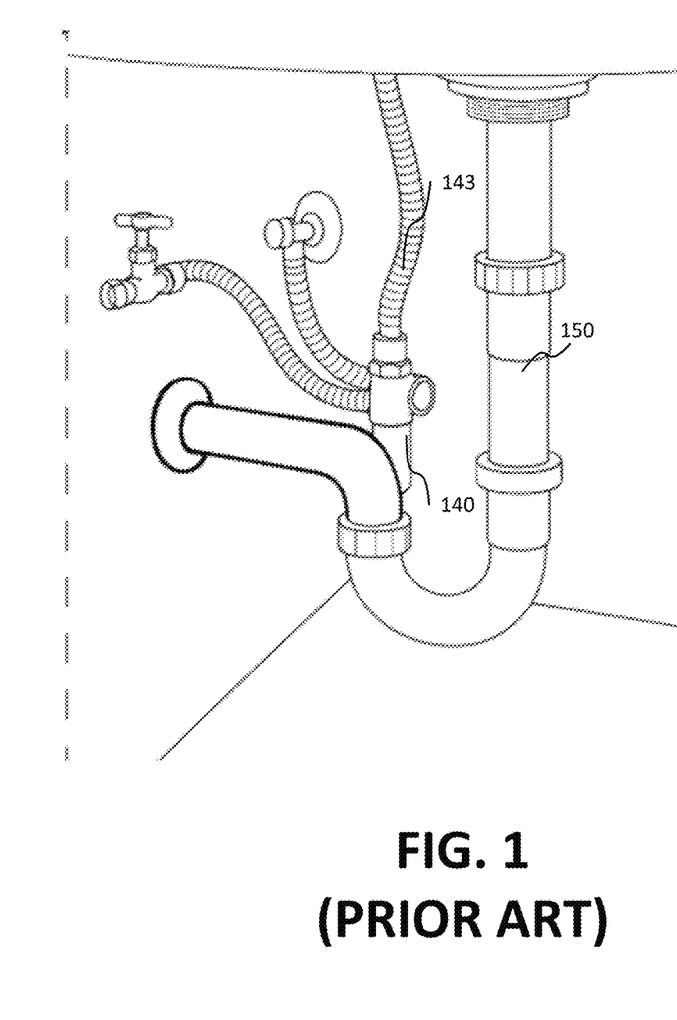
FIG. 1 illustrates a typical installation of a thermostatic mixing valve (TMV) under a sink.

FIG. 1 illustrates a typical installation of a TMV. As shown, the TMV 140 may be positioned in the area beneath a sink. The TMV 140 may be connected to the water supply lines and an outlet line 143 leading to the faucet. However, the TMV 140 may not be secured to any structural component. Instead, the TMV 140 may hang loosely, supported only by the attached hoses, often in proximity to the drainpipe assembly 150. This common installation technique leaves the TMV 140 vulnerable to movement and potential damage, while also posing a safety risk due to its unsecured and potentially hot state.

While some mounting solutions exist, these solutions often involve brackets specific to certain TMV brands or configurations. These brackets typically require screwing into the wall or cabinetry under the sink, which can cause damage to these structures. Installation can be particularly challenging or damaging depending on the wall material, such as tile. Furthermore, the brand-specific nature of these existing brackets limits their overall utility, as they cannot be used universally with different types of TMVs.

BRIEF SUMMARY

The present disclosure achieves technical advantages as an improved mounting system for a thermostatic mixing valve (TMV). In particular, embodiments of the present disclosure provide a mounting system that may allow a TMV to be securely mounted under a sink without requiring attachment to a wall, avoiding potential damage to the sink structure. Instead, the mounting system of embodiments is configured to attach directly to a pipe (e.g., a drainpipe) of the drain system (e.g., a drainpipe under the sink).

In embodiments, the mounting system may include a pipe-mounting section, a securing section, and optionally, a support section connecting the pipe-mounting section to the securing section. The pipe-mounting section may be configured to engage and secure the mounting system to a pipe, such as a drainpipe under the sink. Various non-destructive attachment mechanisms may be employed for this purpose, such as clamps, adhesives, magnets, etc., allowing secure mounting of the mounting system to the pipe without damaging sink walls. In some embodiments, the attachment mechanism may also allow the mounting system to rotate around the pipe for optimal positioning to prevent exposure of the potentially hot TMV to vulnerable persons or pets.

In embodiments, the securing section may be configured to receive and releasably hold the TMV. In embodiments, the securing section may include a holder, such as a clip, clamp, compliant claw, may utilize magnets or adhesives, configured to securely grip a portion of the TMV while still allowing for its removal from the holder. In embodiments, the support section, when present, may provide structural support and spacing between the pipe-mounting section and the securing section. In some configurations of the mounting system, such as a square U-shape, one vertical arm may act as the pipe-mounting section, the other vertical arm may act as the securing section, and the horizontal arm may act as the support section. This mounting system may provide a stable and secure mounting for the TMV, preventing issues associated with unsupported valves and enhancing safety.

It is an object of the disclosure to provide a device for mounting a valve to a pipe. It is a further object of the disclosure to provide a system for mounting a valve to a pipe. It is a further object of the disclosure to provide a method of using a mounting system for mounting a valve. It is a further object of the disclosure to provide method of manufacturing a device for mounting TMVs.

In one particular embodiment, a device for mounting a valve to a pipe is provided. The device includes a pipe-mounting section configured to engage an outer surface of the pipe and cooperate with an attachment mechanism to non-destructively secure the pipe-mounting section to the pipe, and a securing section connected to the pipe-mounting section In embodiments, the securing section includes a holder configured to releasably secure at least a portion of the valve therein.

In another embodiment, a mounting system for mounting a valve to a pipe is provided. The system includes a pipe-mounting section configured to engage an outer surface of the pipe and cooperate with an attachment mechanism to non-destructively secure the pipe-mounting section to the pipe, a securing section including a holder configured to releasably secure at least a portion of the valve therein, and a support section connecting the pipe-mounting section and the securing section. In embodiments, the support section is configured to provide structural support and maintain a spatial relationship between the pipe-mounting section and the securing section.

In still another embodiment, a method of mounting a valve using a mounting system is provided. The method includes positioning a pipe-mounting section of a mounting system against an outer surface of a pipe of a drain system, securing the pipe-mounting section to the pipe using an attachment mechanism of the mounting system, and positioning at least a portion of the TMV within a securing section of the mounting system. In embodiments, positioning the at least a portion of the TMV within the securing section includes the at least a portion of the TMV engaging with a holder of the securing section.

In yet another embodiment, a method of manufacturing a mounting system for mounting a valve is provided. The method includes forming a pipe-mounting section of a mounting system, forming a securing section of the mounting system, and forming, optionally, a support section of the mounting system. In embodiments, the support section may be configured to provide structural support and connect the pipe-mounting section and the securing section together. The method also includes connecting the formed sections together to form the mounting system. In embodiments where the mounting system is formed as a single integral unit (e.g., a U-shaped), the connecting the formed sections together may be inherent in the forming of the pipe-mounting section, the securing section, and the support section.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, the issuance of this patent is evidence that: the elements and limitations presented in the claims are enabled by the specification and drawings, the issued claims are directed toward patent-eligible subject matter, and the prior art fails to disclose or teach the claims as a whole, such that the issued claims of this patent are patentable under the applicable laws and rules of this country.

Figure 2:
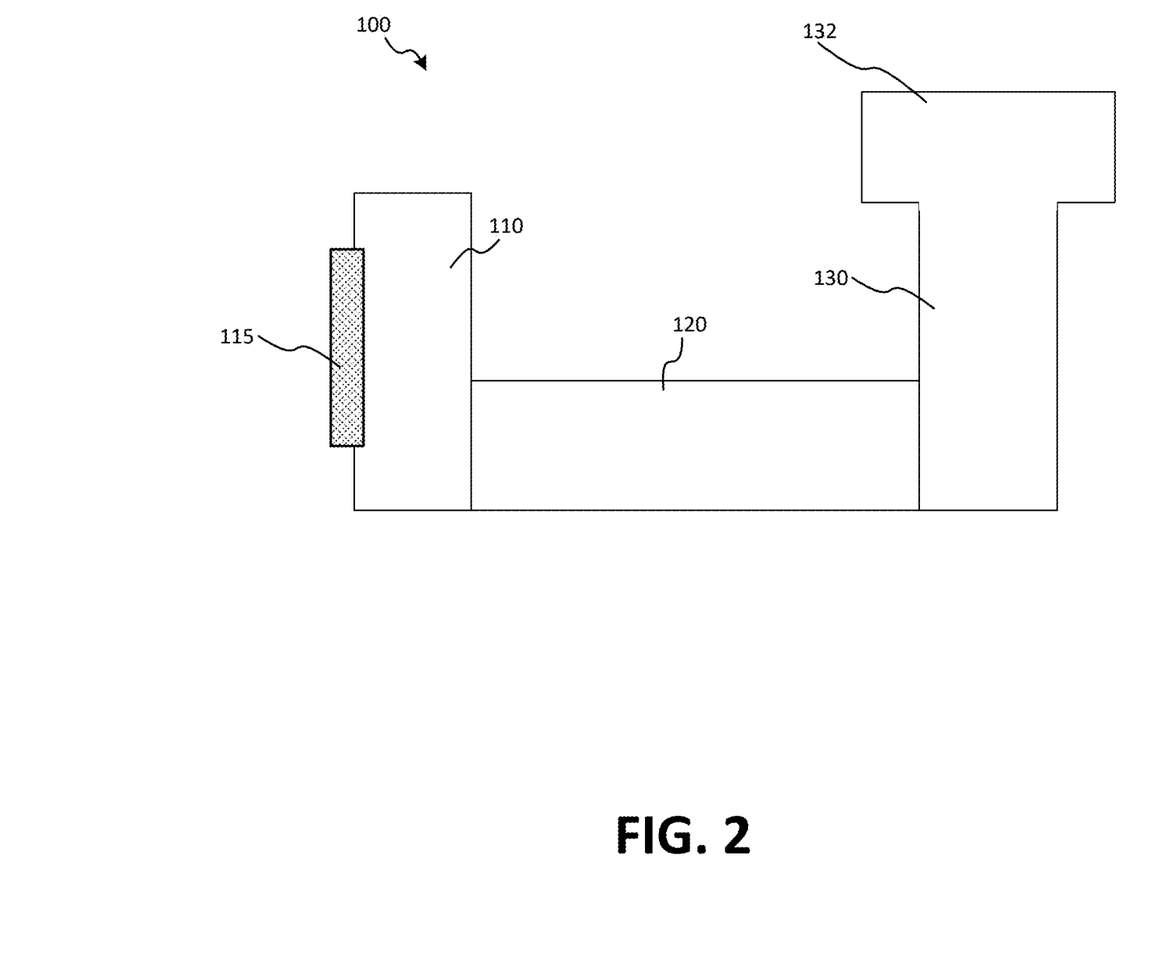
FIG. 2 shows a block diagram of an exemplary mounting system configured with capabilities and functionality for mounting a TMV in accordance with embodiments of the present disclosure.

FIG. 2 shows a block diagram of an exemplary mounting system 100 configured with capabilities and functionality for mounting a thermostatic mixing valve (TMV) in accordance with embodiments of the present disclosure. As shown in FIG. 2, the mounting system 100 may include a pipe-mounting section 110 and a securing section 130. In some optional embodiments, a support section 120 may be included connecting the pipe-mounting section 110 and a securing section 130, but in some embodiments the support section 120 may be excluded and the pipe-mounting section 110 may be connected directly to the securing section 130. The components of the mounting system 100 may be configured to include various designs and/or configurations for providing functionality as described in embodiments of the present disclosure.

In embodiments, any and/or all components of the mounting system 100, including the pipe-mounting section 110, the optional support section 120, and the securing section 130, may be constructed from a variety of materials configured with properties such as strength, durability, rigidity, resistance to corrosion, temperature tolerance, and ease of manufacturing. In some embodiments, the choice of material may depend on the specific application requirements, desired lifespan, cost considerations, the manufacturing process employed, etc.

In embodiments, one or more components of the mounting system 100 may be constructed from metal. For example, metals may include stainless steel, known for its strength and corrosion resistance, making it ideal for the potentially damp environment under a sink. Other metals like aluminum (which is lightweight and corrosion-resistant), brass, or steel (potentially coated with zinc, chrome, powder coating, or other protective layers to prevent rust) may also be used to construct one or more components of the mounting system 100. In embodiments, the rigidity of metal components may ensure a stable support for the TMV.

In embodiments, one or more components of the mounting system 100 may be constructed from plastics. For example, various types of rigid or semi-rigid plastics may be used, which may offer advantages such as water resistance, electrical insulation, cost-effective manufacturing through processes like injection molding, etc. Some examples of plastics may include Polyvinyl Chloride (PVC), Acrylonitrile Butadiene Styrene (ABS), polypropylene (PP), nylon, High-Density Polyethylene (HDPE), or other engineered polymers designed for strength and durability in plumbing applications.

In embodiments, one or more components of the mounting system 100 may be constructed from other sturdy materials. For example, composite materials, such as fiber-reinforced plastics (e.g., fiberglass), may be used to offer enhanced strength-to-weight ratios. In some embodiments, ceramics may be used for their high rigidity and corrosion resistance. In some embodiments, suitably treated and sealed hardwoods may be used, even though woods are less common in typical plumbing accessory applications due to moisture concerns.

In embodiments, one or more of the components of the mounting system 100 may be manufactured using a variety of techniques. For example, for components made from plastic materials, injection molding may be used as a manufacturing method. Injection molding may be used for high-volume production and may be used to form features like clips or holders integrally. Other plastic forming techniques like extrusion or thermoforming may also be used, depending on the specific design of the components.

In embodiments, additive manufacturing, such as 3D printing, may be used for manufacturing one or more of the components of the mounting system 100. In some embodiments, this technique may be used for prototyping, custom designs, or lower volume production runs. In embodiments, the various 3D printing technologies such as fused deposition modeling (FDM), stereolithography (SLA), or selective laser sintering (SLS) may be used.

In embodiments, for components constructed from metal, manufacturing may include casting, stamping or pressing, forging, machining (e.g., computer numerical control (CNC) milling or turning, etc.), metal extrusion, forming operations like bending, etc., may be used to construct one or more of the components of the mounting system 100.

In some embodiments, the mounting system 100 may be manufactured as a single integral unit or may be assembled from multiple individually manufactured components. For example, the pipe-mounting section 110, the securing section 130, and the support section 120 may be manufactured as a single integrated unit, or may be manufactured as different components and then assembled together. In embodiments without the support section 120, the pipe-mounting section 110 and the securing section 130 may be manufactured as a single integrated component, or may be manufactured as different components and then assembled together. In embodiments, assembly techniques may include using of mechanical fasteners (e.g., screws, bolts, rivets, etc.), welding, adhesive bonding, snap-fit designs, etc. allowing different sections (e.g., pipe-mounting section 110, support section 120, and securing section 130) to be potentially made from different materials, and/or to be joined or assembled together using different techniques to form the complete mounting system 100.

In optional embodiments, the support section 120 may be configured to connect the pipe-mounting section 110 to the securing section 130 and to operate as structural support for the mounting system 100. In embodiments, the support section 120 may extend between the pipe-mounting section 110 and the securing section 130. The support section 120 may operate to provide structural support and rigidity to the overall mounting system 100. In embodiments, the support section 120 may also operate to maintain a desired spatial relationship and connection between the point where the system mounts to the pipe (e.g., using pipe-mounting section 110) and the point where the TMV is held (e.g., the securing section 130).

It is noted that the support section 120 may be an optional component. In some embodiments, the mounting system 100 may be configured without a distinct support section 120. In these embodiments, the pipe-mounting section 110 may be attached directly to the securing section 130. The inclusion or exclusion of the support section 120 may be based on factors such as the desired overall strength, the specific geometry required for a particular installation, material properties, manufacturing considerations, etc.

In embodiments where the mounting system 100 is configured in a shape resembling a square U, the support section 120 may form the horizontal arm connecting the two vertical arms, where one vertical arm includes the pipe-mounting section 110 and the other vertical arm includes the securing section 130. The length and configuration of the support section 120 may influence the offset distance between the drain pipe 150 and the secured TMV 140, which may allow for adjustment in positioning the TMV within the under-sink space. In some embodiments, the length of the support section 120 may be adjustable, which may allow the mounting system to adapt to particular TMV configurations.

The pipe-mounting section 110 may be configured to mount and secure the entire mounting system 100 to a pipe 150, which may include a pipe forming part of the drain system located under a sink. In embodiments, the pipe-mounting section 110 may enable attachment to the existing pipe structure rather than requiring penetration or modification of a wall surface within the under-sink cabinet.

In embodiments, the physical form of the pipe-mounting section 110 may vary. In some embodiments, such as the U-shaped configuration (e.g., shown in FIG. 4), the pipe-mounting section 110 may be one of the vertical arms of the mounting system 100. In embodiments, the surface of the pipe-mounting section 110 facing the pipe 150 may be flat, curved, or otherwise contoured to conform to the shape of the pipe to which it is attached to facilitate stable contact with the outer surface of the pipe 150. In some embodiments, the surface of the pipe-mounting section 110 facing the pipe 150 may include a soft surface to prevent damage to the pipe 150 and/or may include a "grippy" or adhesive surface to enhance retention between the surface of the pipe-mounting section 110 facing the pipe 150 and the pipe 150.

In embodiments, the pipe-mounting section 110 may be configured to include or cooperate with an attachment mechanism 115 to achieve securement to the pipe 150. In embodiments, the attachment mechanism 115 may be configured to secure the pipe-mounting section 110 (and thus the entire mounting system 100) to the pipe 150. Advantageously, the attachment mechanism 115 may be configured to be non-destructive, and may not require drilling holes or otherwise damaging the walls or cabinetry under the sink. Furthermore, in some embodiments, the nature of the attachment provided by the pipe-mounting section 110 and the attachment mechanism 115 may allow the mounting system 100 to be rotated around the pipe 150. This rotational adjustability may allow the mounted TMV 140 to be optimally positioned, for example, pushed towards the back of the under-sink space, which may reduce the risk of accidental contact, especially for children or individuals with disabilities.

In embodiments, the attachment mechanism 115 may include a band clamp. In these embodiments, the pipe-mounting section 110 of the mounting system 100 may be placed against the outer surface of the drainpipe 150. A separate band clamp, which may be made of metal or strong plastic with a tightening mechanism (e.g., a screw drive or the like), may then be positioned around both the pipe 150 and the pipe-mounting section 110 (or a feature on the pipe mounting section 110). Tightening the clamp may apply a radial pressure, securely fastening the pipe-mounting section 110 to the pipe 150, which may provide a strong, adjustable, and removable attachment.

In embodiments, the attachment mechanism 115 may include an adhesive. For example, a suitable adhesive, such as a strong epoxy, construction adhesive, specialized plumbing adhesive, etc., may be applied to the contact surface of the pipe-mounting section 110 before the contact surface is pressed against the pipe 150. Once cured, the adhesive may form a strong bond securing the mounting system 100 in place. In some embodiments, the adhesive may be pre-applied to the contact surface and may be activated by pressing the adhesive against the pipe 150.

In embodiments, the attachment mechanism 115 may include magnets. These particular embodiments may be applicable in implementations where the pipe 150 is made of a ferromagnetic material (e.g., cast iron, galvanized steel, etc.), or if a corresponding magnetic or ferromagnetic element is attached to the pipe. One or more strong magnets integrated into or attached to the pipe-mounting section 110 may magnetically attract the pipe 150 (or the attached element), holding the mounting system 100 securely in place through magnetic force.

In embodiments, the attachment mechanism 115 may include welding. In these embodiments, the attachment mechanism 115 may include directly welding the pipe-mounting section 110 to the pipe 150. This type of attachment mechanism 115 may be suitable for permanent installations, as it may not be easily removed or adjusted.

In embodiments, the attachment mechanism 115 may be configured as a mechanical clip or claw structure. This claw may be integrated into the pipe-mounting section 110 and may be configured with sufficient compliance and geometry to snap onto or securely pinch the pipe 150. These embodiments may use the inherent spring properties of the material (e.g., certain plastics, spring steel or metal, etc.) to maintain a clamping force against the pipe 150, allowing the mounting system 100 to be easily clipped on and potentially removed without tools.

In some embodiments, the attachment mechanism 115 may include straps utilizing hook-and-loop fasteners (e.g., Velcro®) or adjustable ratchet mechanisms that may be wrapped around the pipe 150 and the pipe-mounting section 110 to cinch them together. In some embodiments, such as when the pipe-mounting section 110 partially encircles the pipe 150, one or more set screws (e.g., in some embodiments with non-marring tips) may be threaded through the pipe-mounting section 110 to bear against the pipe surface, providing securement through localized pressure. In some embodiments, a friction-fit or interference-fit design, such as including elastomeric materials on the contact surface of the pipe-mounting section 110, may be used to grip the pipe 150 tightly. In some embodiments, cable ties or zip ties may be used as a low-cost attachment mechanism 115 in some applications.

The securing section 130 may be configured to receive and releasably secure the TMV. In embodiments, the securing section 130 may operate in conjunction with the pipe-mounting section 110 (and the optional support section 120) to hold the TMV in a stable position relative to the pipe 150. In embodiments, the securing section 130 may provide the direct interface for holding the TMV.

In embodiments, the securing section 130 may include or define a holder 132, which may be configured to engage and retain the TMV. In embodiments, the holder 132 may be configured to engage at least a portion of the TMV. The holder 132 may be configured to allow the TMV to be secured reliably during normal operation but also allow the TMV to be removed from the holder 132, such as for maintenance or replacement, without needing to detach the entire mounting system 100 from the pipe 150. In embodiments, the size and shape of the holder 132 opening may be adapted to accommodate various TMV sizes and configurations, and in some embodiments may be configured to hold one of the arms or connection points of the TMV.

In embodiments, the holder 132 may include a clip or a compliant claw structure. This clip may be formed from a resilient material (e.g., spring steel or certain plastics) shaped to allow the TMV, or a portion of the TMV to be inserted and snapped snugly into place, where the TMV may be held securely by a pinching or gripping force. In embodiments, the clip may be shaped like an open-ended wrench or similar form to cradle a specific part of the TMV body.

In embodiments, the holder 132 may use magnets to retain the TMV. For example, in implementations where the TMV has a ferromagnetic body or if a compatible magnetic element is attached to the TMV, magnets embedded in or attached to the holder 132 may provide the securing force. In some embodiments, the holder 132 may use an adhesive surface or layer. A suitable adhesive may provide a releasable bond, similar to command strips or a specialized tacky surface, allowing the TMV to be pressed into place and later removed.

In embodiments the holder 132 may include a more mechanical clamp integrated into the holder 132. For example, the integrated clap may include a small screwactuated clamp, a lever clamp, or another mechanism configured to actively grip and secure the TMV within the holder 132. In some embodiments, a hook-and-loop fastener material, such as Velcro®, may be used by the holder 132 to retain the TMV in place. In embodiments, a part of the fastener may be on the holder 132 and the mating part on the TMV, allowing the TMV to be pressed into place and held securely.

In embodiments, the holder 132 may include passive features such as ridges, bumps, or specific textures on its interior surface to enhance retention. These features may be configured to increase friction or provide mechanical interference to help prevent the TMV from unintentionally sliding out of the holder 132. In some embodiments, other mechanisms such as adjustable straps (e.g., elastic, rubber, or fabric) may be used to wrap around the TMV and fasten to the securing section 130. In embodiments, a shaped socket or recess conforming closely to a part of the TMV body may form the holder 132, which may be used in conjunction with another securing means described herein.

Figure 3:
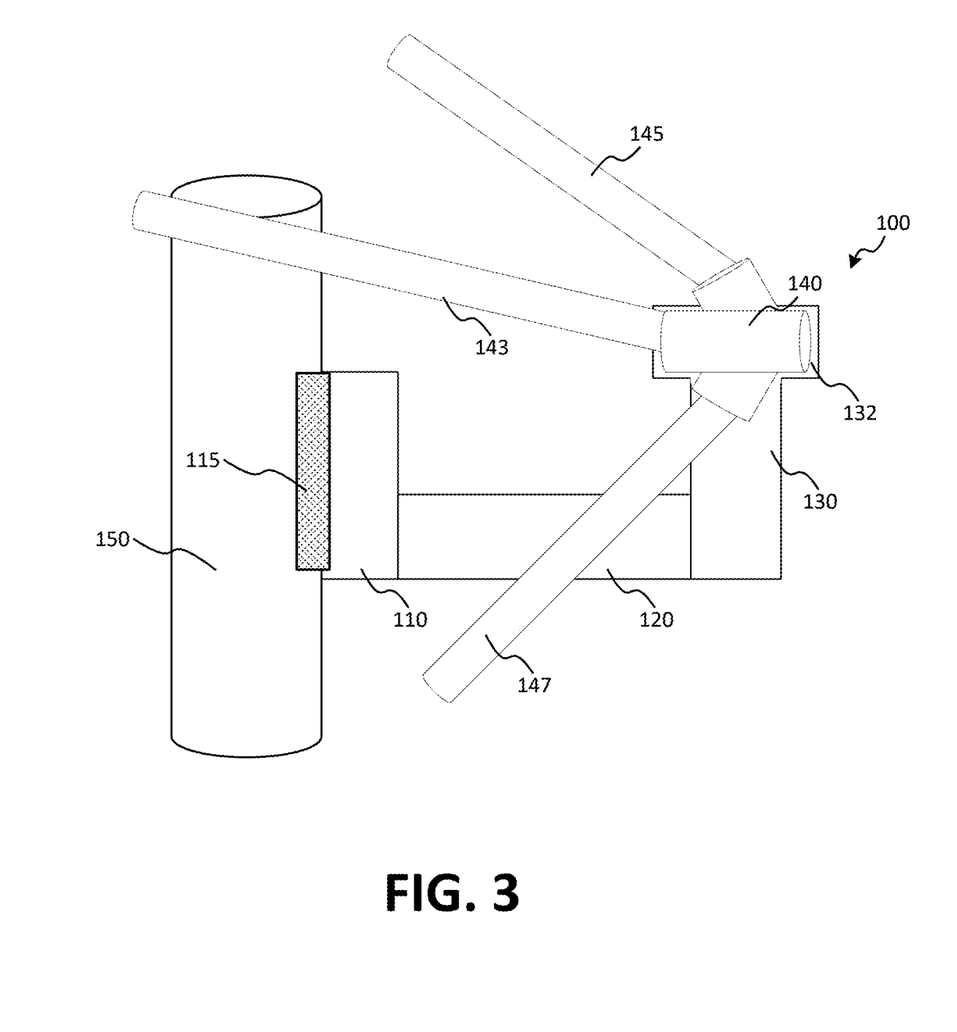
FIG. 3 shows exemplary mounting system during operations to mount a TMV in accordance with embodiments of the present disclosure.

FIG. 3 shows exemplary mounting system 100 during operations to mount a TMV in accordance with embodiments of the present disclosure. In particular, the mounting system 100 is shown during installation relative to a pipe 150 and a TMV 140. As shown, the pipe-mounting section 110 of the mounting system 100 may be positioned adjacent to, and abutting against, the exterior surface of the pipe 150, which may represent a component of the under-sink drain system. The attachment mechanism 115 is shown engaging both the pipe 150 and the pipe-mounting section 110, and may secure the mounting system 100 firmly to the pipe 150.

In this operational configuration, the mounting system 100 may provide a stable platform for mounting the TMV 140. The TMV 140 is shown releasably secured within the holder 132, which may be part of the securing section 130. The securing section 130 may be connected to the pipe-mounting section 110 via the support section 120, which maintains a spatial separation between the pipe 150 and the TMV 140. This configuration may effectively mount the TMV 140 via the mounting system 100 to the pipe 150.

As also shown, hoses 143, 145, and 147 may be connected to respective ports on the TMV 140. These hoses 143, 145, and 147 may represent the conduits for the incoming hot water supply, the incoming cold water supply, and the outgoing mixed water leading to the faucet (not shown). By securing the TMV 140 in this manner, the mounting system 100 may help organize the under-sink space and may prevent the TMV 140 from hanging loosely by these hoses, without damaging any of the sink walls or cabinetry, addressing the drawbacks associated with prior art installations.

Figure 4:
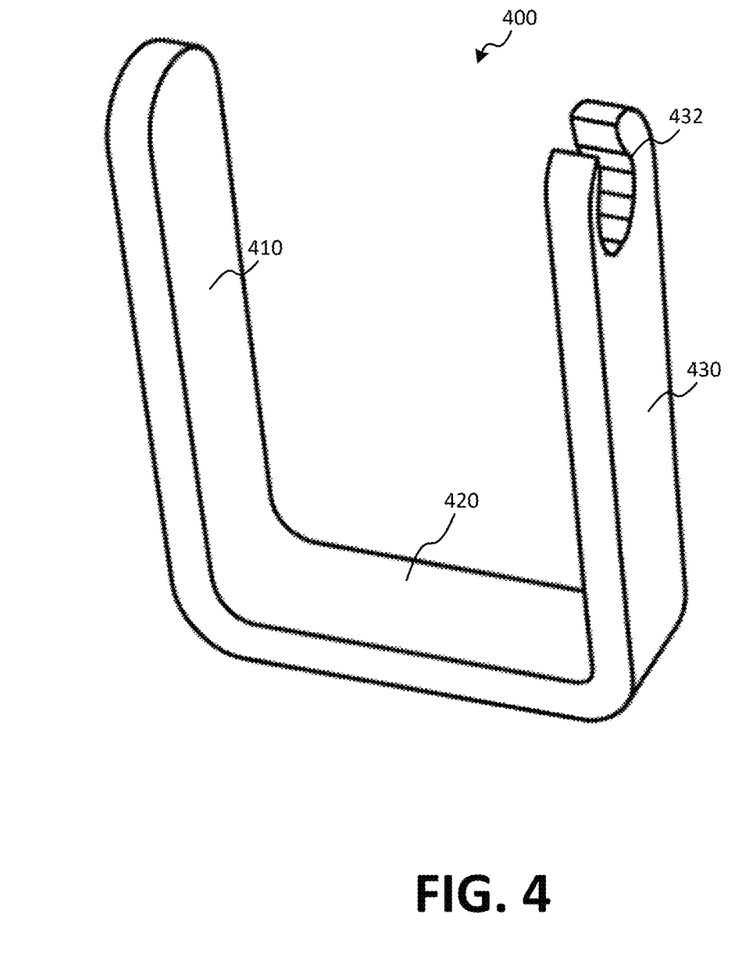
FIG. 4 shows a perspective view of an exemplary mounting system configured with functionality to mount a valve in accordance with embodiments of the present disclosure.

FIG. 4 shows a perspective view of an exemplary mounting system 400 configured with functionality to mount a valve in accordance with embodiments of the present disclosure. In embodiments, mounting system 400 may represent a configuration having a general square U-shape. The mounting system 400 may include a first vertical arm including a pipe-mounting section 410, a second vertical arm including a securing section 430, and a horizontal arm connecting the lower ends of the vertical arms, including a support section 420. In embodiments, the securing section 430 may include an integrated holder 432 located at its upper end, shown as a form of compliant clip or claw having internal ridges or features configured to grip a component inserted therein. In embodiments, the mounting system 400 may include features, components, and functionality as described with reference to the mounting system 100 described herein with reference to FIGS. 2 and 3.

Figure 5:
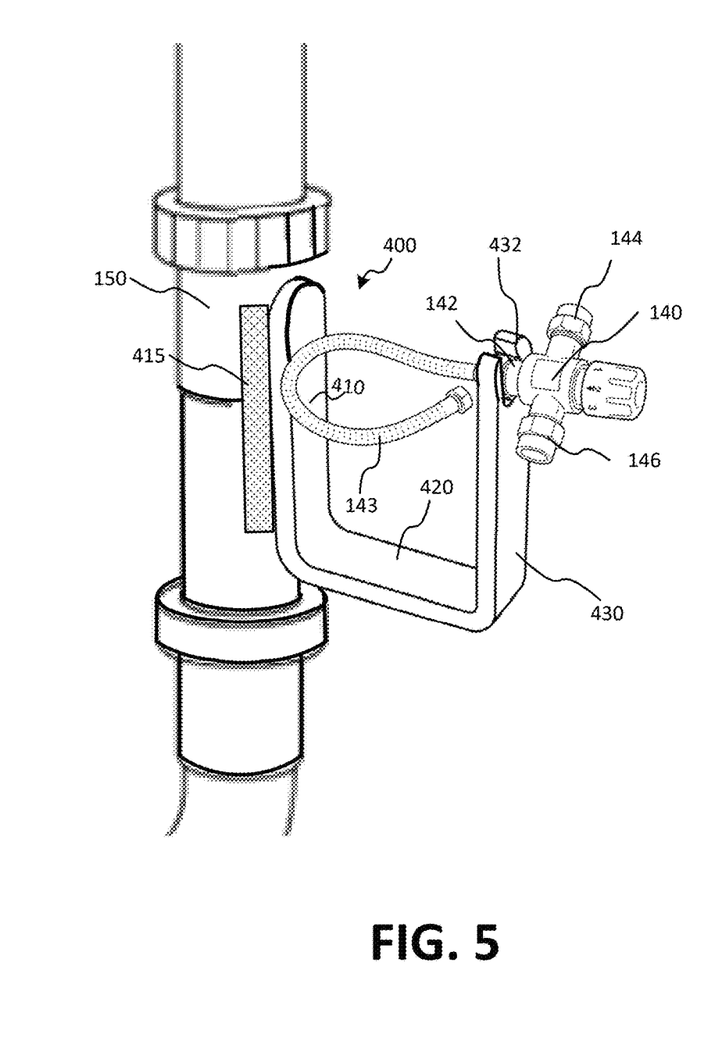
FIG. 5 shows exemplary mounting system during operations to mount a TMV in accordance with embodiments of the present disclosure.

FIG. 5 shows exemplary mounting system 400 during operations to mount a TMV in accordance with embodiments of the present disclosure. In particular, the mounting system 400 is shown during operational use, installed within an under-sink environment. As shown, the pipe-mounting section 410 may be positioned against a pipe 150. An attachment mechanism 415 is shown securing the pipe-mounting section 410 to the pipe 150, and affixing the entire mounting system 400 to the pipe 150's structure. The specific nature of the attachment mechanism 415 may include any of the embodiments previously described herein.

As shown, the TMV 140 may be mounted onto the securing section 430. In this particular example, a portion of the TMV 140, indicated as section 142, which may include an inlet or outlet arm, may inserted into and held by the holder 432 of the securing section 430. The TMV 140 is shown with its associated water connections, including hoses/pipes 143, 144, and 146 representing the mixed water outlet, hot water inlet, and cold water inlet. As shown, the mounting system 400 may provide a secure and stable mounting platform for the TMV 140, utilizing the pipe 150 for support rather than relying on wall attachments or leaving the TMV unsupported. This configuration effectively secures the TMV 140, preventing unwanted movement and potential damage or safety hazards.

Figure 6:
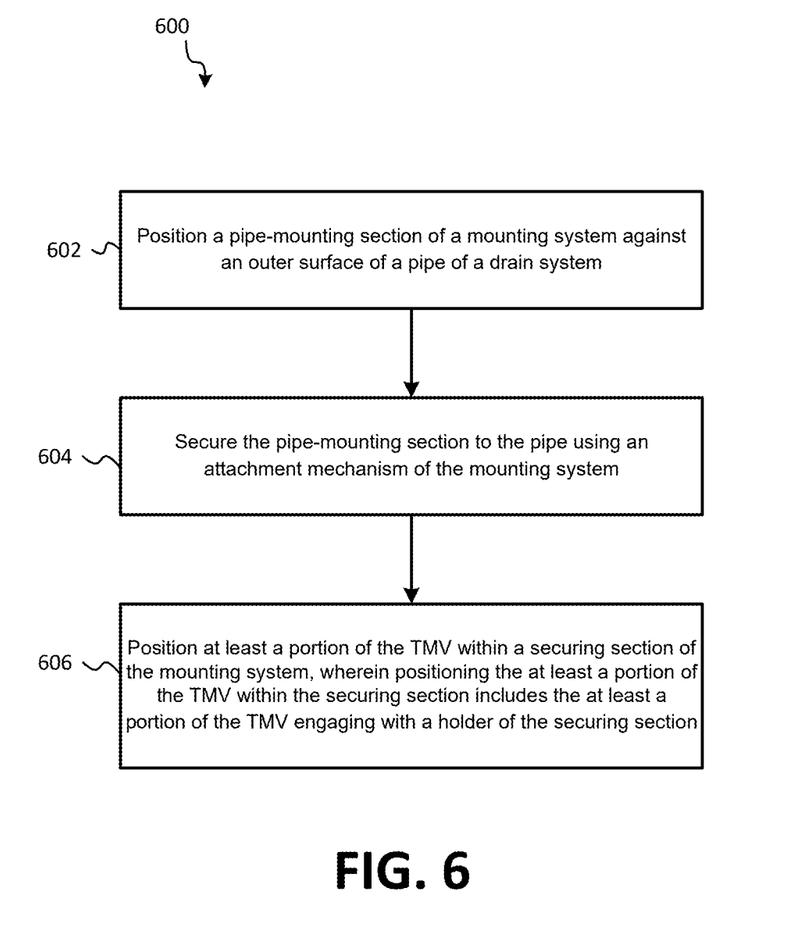
FIG. 6 shows a high-level flow diagram of a method of mounting a valve using a mounting system in accordance with embodiments of the present disclosure.

Operation of a method 600 for mounting a valve using a mounting system will now be discussed with respect to FIG. 6 in accordance with embodiments of the present disclosure. FIG. 6 shows a high-level flow diagram of a method 600 of mounting a valve using a mounting system in accordance with embodiments of the present disclosure. In embodiments, the mounting system may include features, components, and functionality as described with reference to the mounting system 100 and mounting system 400 described herein with reference to FIGS. 2-5.

At block 602, a pipe-mounting section of a mounting system is positioned against an outer surface of a pipe of a drain system. For example, a pipe-mounting section (e.g., the pipe-mounting section 110 of FIGS. 2 and 3 or the pipe-mounting section 410 of FIGS. 4 and 5) may be positioned against an outer surface of a pipe (e.g., the pipe 150 of FIGS. 1-5), which may include a pipe of a drain system under a sink. In embodiments, positioning the pipe-mounting section of the mounting system against the outer surface of the pipe may include orienting the mounting system correctly relative to the pipe where it is intended to be installed.

At block 604, the pipe-mounting section may be secured to the pipe using an attachment mechanism of the mounting system. For example, the pipe-mounting section (e.g., the pipe-mounting section 110 of FIGS. 2 and 3 or the pipe-mounting section 410 of FIGS. 4 and 5) may be secured to the pipe (e.g., the pipe 150 of FIGS. 1-5) using an attachment mechanism (e.g., the attachment mechanism 115 of FIGS. 2 and 3 or the attachment mechanism 415 of FIGS. 4 and 5) of the mounting system. In embodiments, using the attachment mechanism may include, depending on the configuration of the attachment mechanism, tightening a clamp, applying adhesive, engaging magnets, snapping a clip, fastening a strap, or utilizing another non-destructive means to fix the mounting system firmly onto the pipe.

At block 606, at least a portion of the TMV is positioned within a securing section of the mounting system. For example, at least a portion (e.g., portion 142 as illustrated in FIG. 5) of the TMV (e.g., TMV 140 of FIGS. 1-5) is positioned within the securing section (e.g., the securing section 130 of FIGS. 2 and 3 or the securing section 430 of FIGS. 4 and 5) of the mounting system. In embodiments, the positioning the at least a portion of the TMV within the securing section may include the at least a portion of the TMV engaging with a holder (e.g., holder 132 of FIS. 2 and 3, or holder 432 of FIGS. 4 and 5) of the securing section. In embodiments, this may ensure that the TMV is properly seated and held by the mounting system, and may complete the mounting and securement of the valve.

Figure 7:
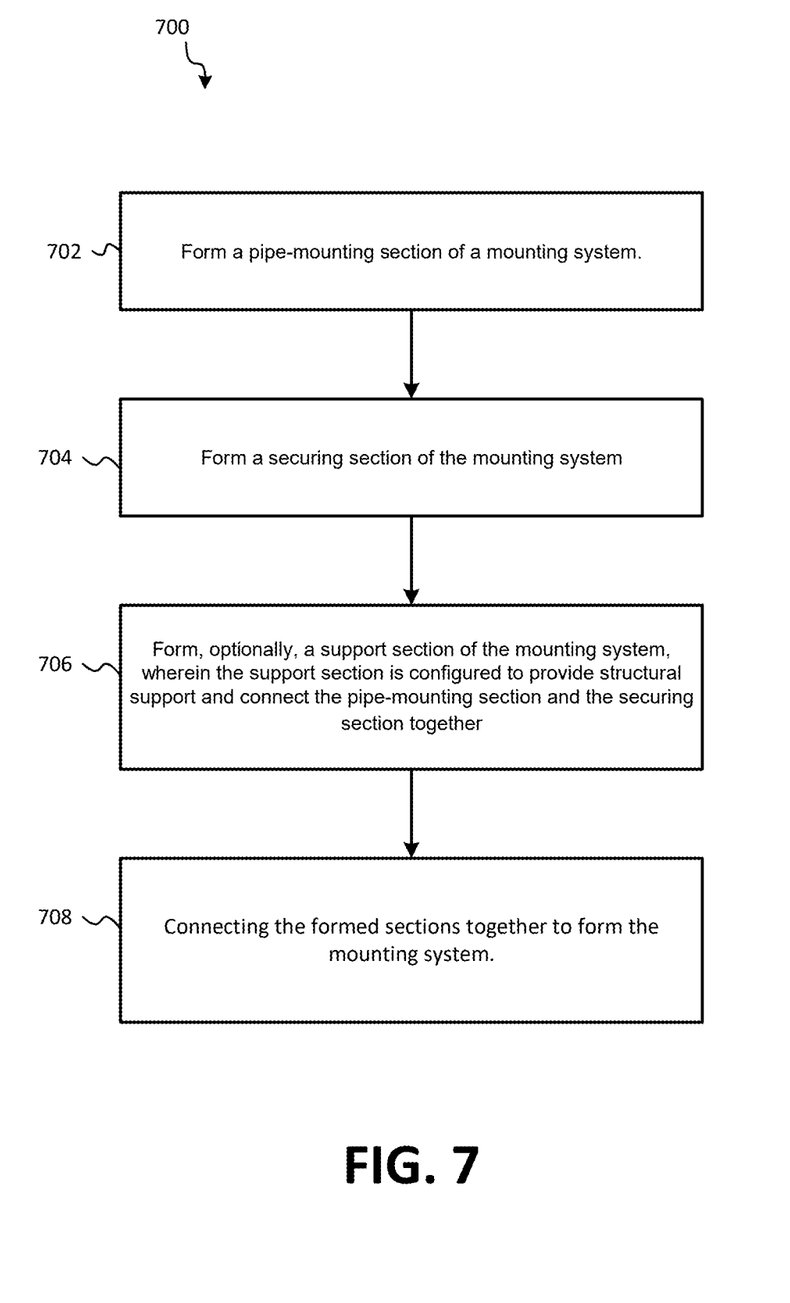
FIG. 7 shows an exemplary flow diagram of a method for manufacturing a mounting system for a thermostatic mixing valve configured in accordance with embodiments of the present disclosure.

FIG. 7 shows an exemplary flow diagram of a method 700 for manufacturing a mounting system for a thermostatic mixing valve configured in accordance with embodiments of the present disclosure. For example, the steps illustrated in the example blocks shown in FIG. 7 may be performed to manufacture the mounting system 100 or mounting system 400 as described herein with reference to FIGS. 2-5.

At block 702, a pipe-mounting section may be formed. For example, a pipe-mounting section (e.g., the pipe-mounting section 110 of FIGS. 2 and 3 or the pipe-mounting section 410 of FIGS. 4 and 5) may be formed. In embodiments, the pipe-mounting section may be configured to engage a pipe (e.g., pipe 150 of FIGS. 1-5) and to cooperate with an attachment mechanism (the attachment mechanism 115 of FIGS. 2 and 3 or the attachment mechanism 415 of FIGS. 4 and 5) for securing the mounting system. In embodiments, forming the pipe-mounting section may include processes such as injection molding, 3D printing, casting, stamping, extrusion, or machining, depending on the material (e.g., plastic, metal) and configuration of the pipe-mounting section. In embodiments, forming the pipe-mounting section may shape the pipe-mounting section to properly interface with both the target pipe and a selected attachment mechanism.

At block 704, a securing section may be formed. For example, a securing section (e.g., the securing section 130 of FIGS. 2 and 3 or the securing section 430 of FIGS. 4 and 5) may be formed. In embodiments, the securing section may be configured to receive and releasably hold a thermostatic mixing valve (e.g., TMV 140 of FIGS. 1, 3, and 5). In embodiments, forming the securing section may include processes such as injection molding, 3D printing, casting, stamping, extrusion, or machining, depending on the material (e.g., plastic, metal) and configuration of the securing section. In embodiments, forming the securing section may include creating or integrating a holder feature (e.g., the holder 132 of FIGS. 2 and 3 or the holder 432 of FIGS. 4 and 5) configured to engage and retain the valve.

At block 706, optionally, a support section may be formed. For example, a support section (e.g., the support section 120 of FIGS. 2 and 3 or the support section 420 of FIGS. 4 and 5) may be formed. In embodiments, the support section may be configured to provide structural support and connect the pipe-mounting section (e.g., the pipe-mounting section 110 of FIGS. 2 and 3 or the pipe-mounting section 410 of FIGS. 4 and 5) to the securing section (e.g., the securing section 130 of FIGS. 2 and 3 or the securing section 430 of FIGS. 4 and 5). In embodiments, forming the support section may include processes such as injection molding, 3D printing, casting, stamping, extrusion, or machining, depending on the material (e.g., plastic, metal) and configuration of the support section. In embodiments where the support section is included, forming the support section may establish a spatial relationship between the pipe-mounting section and the securing section.

At block 708, the formed sections may be assembled or connected. For example, the pipe-mounting section formed at block 702, the securing section formed at block 704, and the optional support section formed at block 706 may be joined to create the complete mounting system (e.g., the mounting system 100 of FIGS. 2 and 3 or the mounting system 400 of FIGS. 4 and 5). In embodiments, assembling the sections may include using mechanical fasteners, welding, adhesive bonding, snap-fit features, or other suitable joining techniques appropriate for the materials and configuration. In embodiments where the mounting system is formed as a single integral unit (e.g., the U-shaped embodiment 400 of FIGS. 4 and 5 via molding or bending), the assembly step may be inherent in the forming process of blocks 702, 704, and 706.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A device for mounting a valve to a pipe, comprising:
   a first arm of a U-shape structure, the first arm disposed along a first vertical axis, the first arm including a pipe-mounting section configured to engage an outer surface of the pipe and cooperate with an attachment mechanism to non-destructively secure the pipe-mounting section to the pipe; and
   a second arm of the U-shape structure, the second arm disposed along a second vertical axis different from the first vertical axis, the second arm including a securing section connected to the pipe-mounting section, the securing section including a holder disposed at distal end of the securing section and configured to releasably secure at least a portion of the valve therein, the holder configured with a claw-like shape defining a lateral opening facing toward the first arm and an open top end facing in a direction away from the distal end of the securing section.

2. The device of claim 1, wherein the attachment mechanism includes a band clamp configured to encircle the pipe and the pipe-mounting section.

3. The device of claim 1, wherein the attachment mechanism includes an adhesive disposed between the pipe-mounting section and the outer surface of the pipe.

4. The device of claim 1, wherein the attachment mechanism includes at least one magnet configured to magnetically couple the pipe-mounting section to the pipe.

5. The device of claim 1, wherein the attachment mechanism allows rotational adjustment of the device about the pipe when secured thereto.

6. The device of claim 1, wherein the holder includes a compliant clip configured to receive and pinch the at least a portion of the valve.

7. The device of claim 1, wherein the holder includes at least one magnet configured to magnetically retain the at least a portion of the valve.

8. The device of claim 1, wherein the holder includes a hook-and-loop fastener.

9. The device of claim 1, wherein the holder includes one or more features configured to enhance retention of the valve.

10. The device of claim 1, wherein the pipe-mounting section and the securing section are made of one or more of metal and plastic.

11. A mounting system for mounting a valve to a pipe, comprising:
   a first arm of a U-shape structure, the first arm disposed along a first vertical axis, the first arm including a pipe-mounting section configured to engage an outer surface of the pipe and cooperate with an attachment mechanism to non-destructively secure the pipe-mounting section to the pipe;
   a second arm of the U-shape structure, the second arm disposed along a second vertical axis different from the first vertical axis, the second arm including a securing section including a holder disposed at distal end of the securing section and configured to releasably secure at least a portion of the valve therein, the holder configured with a claw-like shape defining a lateral opening facing toward the first arm and an open top end facing in a direction away from the distal end of the securing section; and
   a support section connecting the pipe-mounting section and the securing section, the support section configured to provide structural support and maintain a spatial relationship between the pipe-mounting section and the securing section.

12. The system of claim 11, wherein the attachment mechanism includes a band clamp configured to encircle the pipe and the pipe-mounting section.

13. The system of claim 11, wherein the attachment mechanism allows rotational adjustment of the mounting system about the pipe when secured thereto.

14. The system of claim 11, wherein the holder includes a compliant clip configured to receive and pinch the at least a portion of the valve.

15. The system of claim 11, wherein the holder includes at least one magnet configured to magnetically retain the at least a portion of the valve.

16. The system of claim 11, wherein the system is formed in a generally U-shape configuration.

17. The system of claim 16, wherein the pipe-mounting section includes a first vertical arm of the U-shape configuration, the securing section includes a second vertical arm of the U-shape configuration, and the support section includes a horizontal arm of the U-shape configuration connecting the first vertical arm and the second vertical arm.

18. The system of claim 11, wherein the pipe-mounting section, the securing section, and the support section are made of one or more of plastic or metal.

19. The system of claim 11, wherein the pipe-mounting section, the securing section, and the support section are a single integral unit.

20. The system of claim 19, wherein the system is manufactured as a single integral unit by injection molding or 3D printing.

* * * * *